April 25, 1961 T. P. DIXON 2,981,791

PRINTING TIMER FOR MAKING COLOR POSITIVES ON FILM

Filed March 25, 1957 2 Sheets-Sheet 1

INVENTOR.
THOMAS P. DIXON
BY Lyon & Lyon
ATTORNEYS

April 25, 1961 T. P. DIXON 2,981,791

PRINTING TIMER FOR MAKING COLOR POSITIVES ON FILM

Filed March 25, 1957

2 Sheets-Sheet 2

INVENTOR.
THOMAS P. DIXON
BY
Lyon & Lyon
ATTORNEYS

United States Patent Office 2,981,791

Patented Apr. 25, 1961

2,981,791

PRINTING TIMER FOR MAKING COLOR POSITIVES ON FILM

Thomas P. Dixon, Pacoima, Calif., assignor to Technicolor Corporation, Hollywood, Calif., a corporation of Maine Filed Mar. 25, 1957, Ser. No. 648,301

7 Claims. (Cl. 178—5.2)

Figure 1:
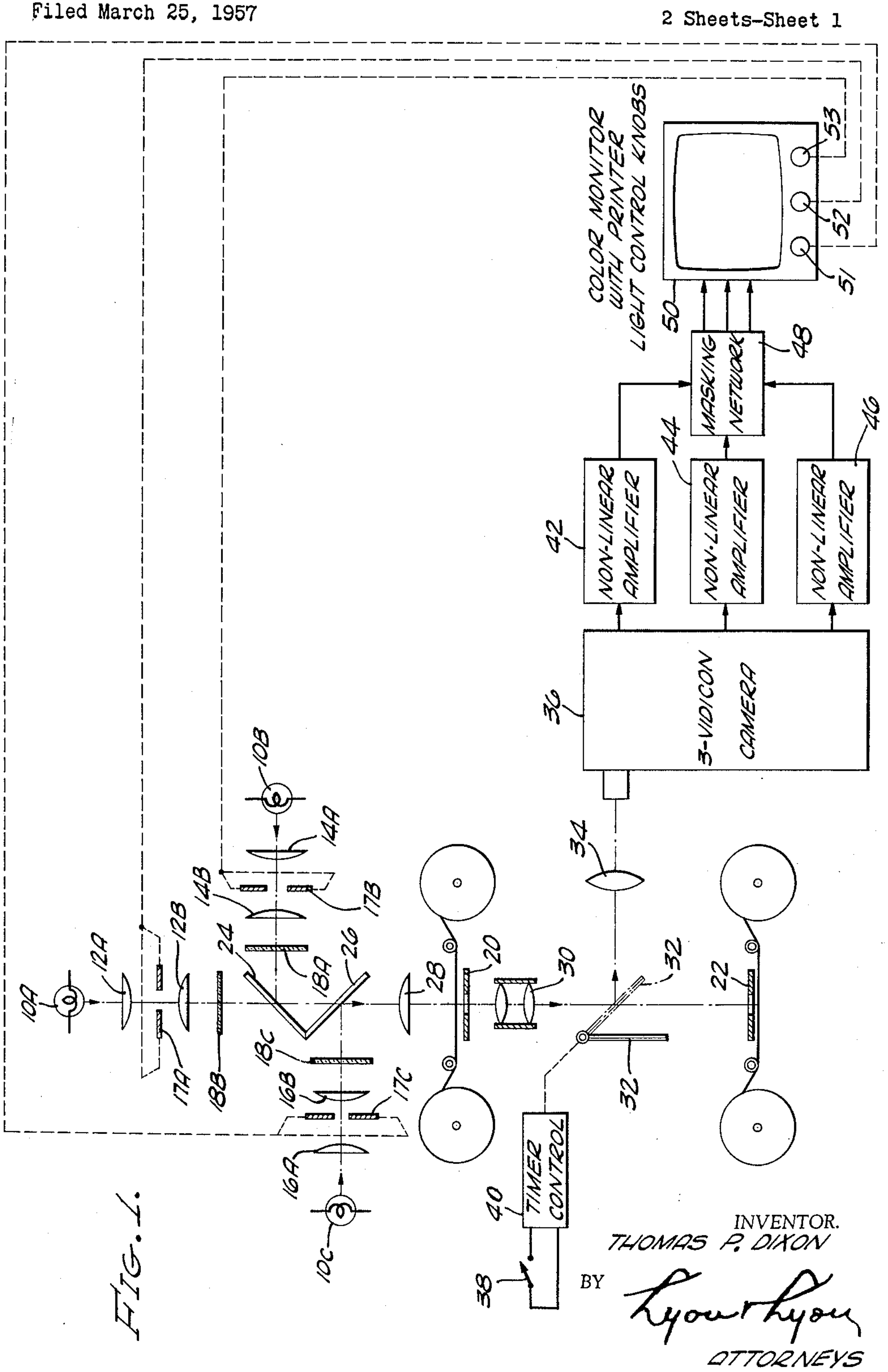

This invention relates to electronic printing timer apparatus for determining the proper parameters required for making color positives on film. More particularly, this invention relates to improvements in such apparatus.

In an application for Printing Timer, filed June 16, 1954, Serial No. 437,258, now Patent No. 2,863,938, by William E. Evans et al., which is assigned to this assignee, there has been described and claimed a printing timer. In this apparatus signals are derived representative of the optical transmission of discrete areas of different color-image-aspect negatives, and these signals are then applied to separate channels. Each channel contains logarithmic amplifiers for converting these signals to density-representative signals. The average level of the density-representative signals in each channel is then established by a controllable peak-clipping circuit. The peak-clipping circuit output is then applied to a linear contrast control amplifier whose gain is controllable. The output of the linear amplifier is then applied to a photocurve amplifier, which modifies the signals applied to it in accordance with the desired relationship between density and cathode-ray tube screen brightness, and also to compensate for nonlinearities in the brightness transfer characteristic of the cathode-ray tube which is employed at the output of each channel. Each of these cathode-ray tubes has a screen phosphor, the color of which provides an additive color component corresponding to the color represented by the image aspect of the channel.

The images on the cathode-ray tube screens are superimposed to present a composite picture in color. The brightness range of reproduction of each color, and thereby the contrast of the composite picture, is controlled by varying the gain of the linear amplifier in each channel. The brightness of each color, and thereby the color balance of the picture, is controlled by clipping the reference signals in each channel at different levels with the peak-clipping circuit. Indicators were provided so that after varying these controls to establish a picture having a desired color balance and contrast, the indications were read from the indicators which provided information both as to the proper contrast and printer-light illumination required to provide a positive photographic print having substantially the same contrast and color balance. To simulate in the electronically presented positive picture the effects of overlap in the color characteristic of the dyes used to make the positive print, means were provided in the form of a resistor network which interconnected each channel for the purpose of feeding signals therebetween.

In an application by this inventor for a Printing Timer, Serial No. 501,162, filed April 13, 1955, an improved arrangement was described which eliminated the requirement for two nonlinear amplifiers but used a single one to perform the functions of both the logarithmic amplifier and the photocurve amplifier. Printer-light-control apparatus, along with the cross-feed networks and contrast controls, were retained, however.

After obtaining the reading from the printer-light control in the printing timer, in order to apply this information it is necessary to use a printing light that is calibrated and to maintain a fixed relationship between its output and the printer-light-control indications obtained from the electronic timer. This is essential, in order to insure that when a print is being made, using the information derived, the correct printer-light brightness is employed. The previously described systems also require that a reel of film first has to be completely processed on the electronic printing timer, a record must be made of the data derived, the film must next be mounted again for the purpose of being exposed in accordance with the data recorded. This provides somewhat of a time delay in the processing of the film. Further, an opportunity for error may arise since human intervention is required to read the recorded data and vary the printer lights accordingly. The above disadvantages are not recited either for the purpose of deprecating the operability or utility or novelty of these previous systems. These are merely being recited by way of showing the advantages of this invention.

It is an object of the present invention to provide an improved printing timer wherein the additional handling of film for exposure purposes after the timing procedure has been performed is eliminated.

It is another object of the present invention to provide an improved printing timer arrangement wherein auxiliary printing lights and the requirement for the calibration and maintenance thereof is eliminated.

Yet another object of the present invention is the provision of a print timing and exposure system which is more rapid than those employed heretofore.

Still another object of the present invention is the provision of a novel, useful, and simple print timing and exposure system.

These and other objects of the invention are achieved by providing a system for an electronic print timer wherein the same light source which is employed for establishing a desired positive color reproduction on the cathode-ray tube apparatus is also employed for exposing positive film upon which the color picture is to be finally developed.

Figure 2:
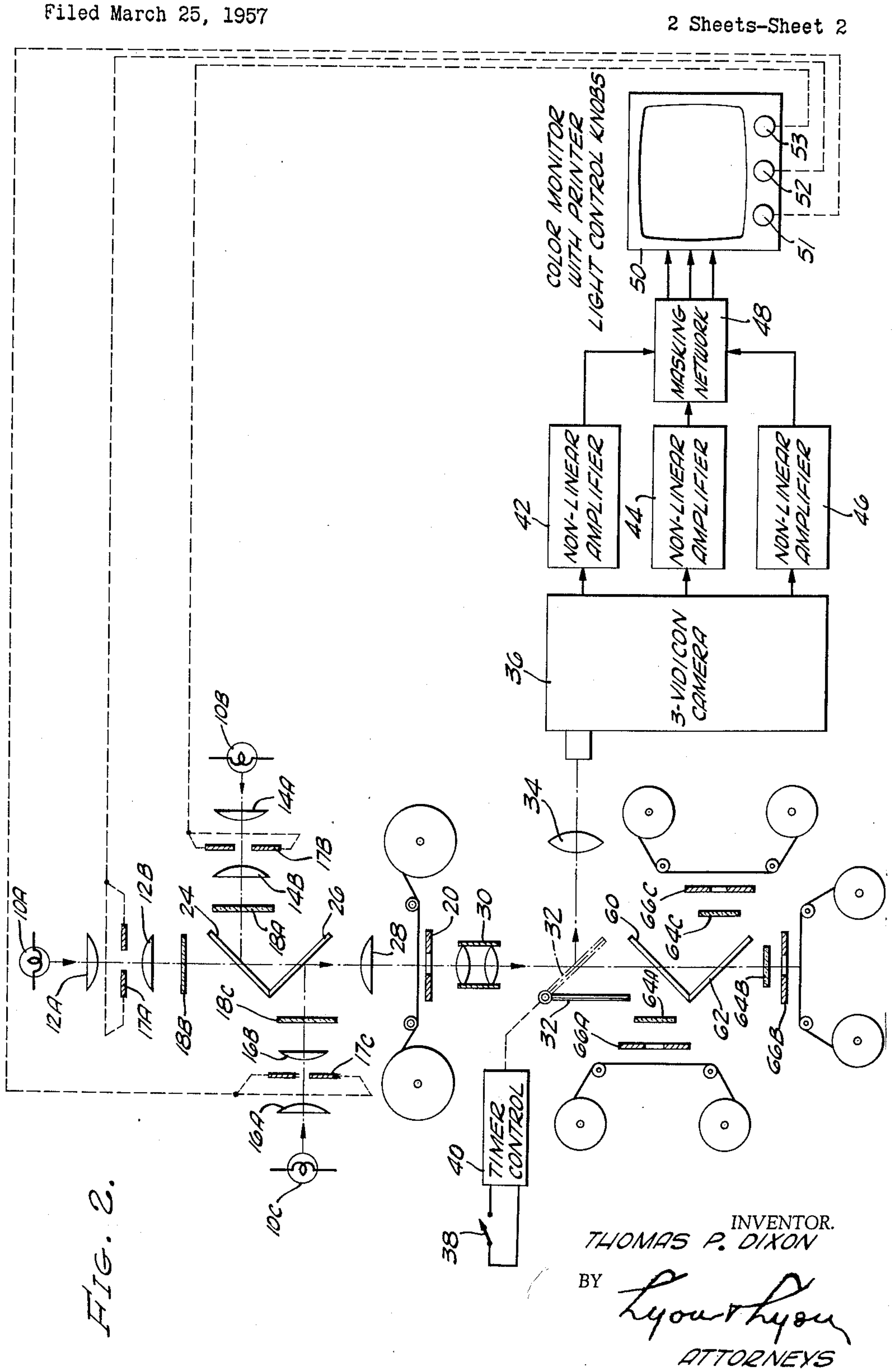

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a block diagram of an embodiment of the invention which may be employed where a single negative contains all the color-image aspects and the printing is done onto a single film or paper containing all three color-image aspects; and Figure 2 is a block diagram of an embodiment of the invention wherein a single film contains all the color-image aspects and the printing is done onto three separation films, each containing a single color-image aspect.

As pointed out above, the applications by Evans et al. and by this inventor are directed to apparatus wherein either the single negative containing all the color-image aspects of an object, or three negatives containing the respective color-image aspects of a negative are scanned and the signals derived as a result of this scanning are processed through three color channels, so that when a desired picture in color, which is a positive picture of the object, is obtained, information is provided for control of the printer light and the contrast range to reproduce, on positive stock, the picture as it appears in the cathode-ray tube apparatus. In those embodiments of the invention, the light source for illuminating the negative material is obtained from a flying-spot scanner which serves both the function of illuminating the negative as well as scanning it. The present invention employs a nonscanning illumination source, such as a printing lamp, the light intensity from which can be varied as desired to obtain a resultant positive picture having the desired brightness color characteristics. Scanning of the negative is obtained by allowing the transmitted light from the negative to fall upon a television camera.

Referring to Figure 1, there is shown the block diagram of an embodiment of the invention. This includes three light sources 10A, 10B, and 10C from which light is applied to the usual condenser lenses 12A, 12B, 14A, 14B, 16A, and 16B. Between the condenser lenses there is positioned variable light-brightness control apparatus 17A, 17B, and 17C. This apparatus can be a variable diaphragm, for example, which is either mechanically or electrically operable to establish the brightness of the light which is passed therethrough.

The light passing through the diaphragm then falls upon suitable printing filters 18A, 18B, 18C. These printing filters provide the three basic colored lights required for printing a single color negative 20 on positive film stock 22. Two partial mirrors 24, 26 are employed to combine the light from the three filters in well-known manner and reflect it through a suitable lens 28 onto the color-image-aspect negative 20. The light which is transmitted through the negative is passed through an objective lens 30 and strikes a front surface mirror 32.

This mirror 32 is pivotably supported so that in the position shown it permits the light from the objective lens 30 to fall upon the positive film stock, and in the position shown in dotted lines it prevents the light from falling on the film stock and instead reflects it through a relay lens 34 to a color television camera 36. The mirror positions are controlled so that except for the actual exposure time the mirror remains in the dotted position. When it is desired to expose the positive film stock, then the switch 38 is depressed, which causes the timer control 40 to pivot the mirror 32 to the position wherein the film is exposed. It remains in this position for a time which is preset. Then the timer control returns the mirror to the position to reflect the light into the color television camera 36.

The camera is the well-known color television three-vidicon film camera which is described and shown, for example, in an article in "Broadcast News" for May-June 1954, published by Radio Corporation of America, which article is entitled "3-Vidicon Color Film Camera," by H. N. Kozanowski. As shown in that article, the camera utilizes three Vidicons. The incoming light, which is in color, is broken into its three color components by means of mirrors which reflect this light through color filters associated with each color channel onto the photosensitive surface of the three camera tubes. In the present invention, the spectral sensitivities of the camera tubes are modified by these filters to match the spectral sensitivities of the positive print stock. The output of the three tubes is applied to three nonlinear amplifiers 42, 44, and 46, one of which is in each one of the color channels. The three channels are then interconnected by a masking network 48 in a manner so that the effects of dye overlap which occur in the positive film stock, will be simulated in the final positive picture in color, which is reproduced on the cathode-ray tube apparatus 50. The cathode-ray tube apparatus 50 is intended to include the contrast controls for establishing a desired contrast for the picture displayed by the cathode-ray tube apparatus. The nonlinear amplifiers and the masking network are described and shown in the previously mentioned application by this inventor for the Printing Timer. The cathode-ray tube apparatus may consist of either the three cathode-ray tubes having the three primary-color phosphors, or may be a three-gun color cathode-ray tube which can present a color picture on its screen. Preferably the cathode-ray tube apparatus consists of three cathode-ray tubes having white phosphor screens with three appropriate color filters for providing the primary colored light.

The cathode-ray tube apparatus 50 contains three printer-light contols 51, 52, and 53. These are shown for convenience on the cathode-ray tube monitor apparatus. These three controls, however, are connected either electrically or mechanically to vary the variable aperture apparatus 17A, 17B, 17C to control the brightness of the respective printing lamps. It should thus become apparent that by varying the brightness of the printing lamps the brightness of the color picture displayed by the cathode-ray tube apparatus may be varied. When this picture has the desired appearance, then the switch 38 is closed. This enables the timer control 40 to swing the mirror 32 so that the film stock 22 is exposed to the light transmitted through the color-image-aspect negative 20. The timer control may be any ordinary timer which, during the timing operation, energizes a solenoid to pull the mirror out of the path of the light rays. The time during which the mirror is held to permit such exposure is readily determined empirically in advance and, once set, need not be altered. It can be checked periodically in accordance with the customary practice in color-picture processing and printing laboratories.

What is entailed for establishing the time during which the mirror is moved to allow an exposure is to employ a standard negative to establish a color picture on the cathode-ray tube apparatus 50 which is as identical as can be obtained with a desired positive print in color previously made of the standard negative. The printing times or the times during which the mirror is in a position to permit exposure is then varied over a range. A different positive film is exposed for each different printing time. The picture on the thereafter printed positive film which most closely resembles the ideal positive-film picture for which the cathode-ray tube apparatus was set up by varying the printer-light-control knobs 51, 52, 53 then establishes the optimum printing time for the film stock being exposed.

In Figure 2 is shown an arrangement which may be used for printing separation positives from color negatives, or separation negatives from color positives. The system is the same as in Figure 1 through the diverting mirror 32. Beyond this mirror, the light is split by means of partial mirrors 60 and 62. Filters 64A, 64B, and 64C are used to shape the spectral distribution of the light before it is imaged onto films 66A, 66B, and 66C.

The operation of the apparatus is the same as was described previously. The printer-light control knobs 51, 52, 53 are adjusted until a desired presentation of the color picture is shown on a cathode-ray tube screen. At that time, the switch 38 is depressed. This enables the mirror time control to swing the mirror out of the light path for the predetermined time which was established in accordance with the desired standard. Thus, the film stock 66A, 66B, and 66C is exposed for the proper time with light at the proper brightness.

An important application of this embodiment is in printing black-and-white separation negatives from color positives, where separation negatives are needed for exposing lithographic plates in the graphic arts industry, or for exposing gelatin matrix stock for making dye-transfer prints in the amateur-color-printing industry. Another application of this embodiment is in printing black-and-white separation positive from color negatives, where the positives are needed for printing duplicate negatives which, in turn, are used for printing color positives. This procedure is used in the motion picture industry.

Accordingly, there has been described and shown herein novel, useful, and simple apparatus for performing the process of the correct exposure of positive or negative transparencies on photosensitive emulsions, such as positive film or paper stock.

I claim:

1. In apparatus for deriving parameters for properly exposing photosensitive emulsions, said apparatus being of the type wherein electrical signals representative of point-by-point light transmission of a transparency having color-image aspects of an object are applied to associated color channels, and cathode-ray tube apparatus at the outputs of said color channels display a positive picture of said object in color, the improvement comprising a primary color light source for each color channel, means for directing light from all said sources upon said transparency, means in each channel for scanning said transparency for providing electrical signals representative of the transmission of said transparency for the color associated with the channel, means for varying the brightness of each light source to obtain a picture on said cathode-ray tube apparatus having desired color brightness, and means for exposing said photosensitive emulsions to the light passing through said transparency for a predetermined time after said desired color brightness for said color picture is obtained.

2. In printing-timer apparatus as recited in claim 1 wherein said means in each channel for scanning said transparency includes a television camera.

3. In apparatus for deriving parameters for properly exposing photosensitive emulsions, said apparatus being of the type wherein electrical signals representative of point-by-point light transmission of a transparency having color-image aspects of an object are applied to associated color channels, and cathode-ray tube apparatus at the outputs of said color channels display a positive picture of said object in color, the improvement comprising a primary color light source for each color channel, means for directing light from all said sources upon said transparency, a plurality of variable apertures a different one of which is positioned between each light source and said transparency for controlling the brightness of light from said source, a means in each channel for scanning said transparency for deriving electrical signals representative of the transmission of said transparency for the color associated with the channel, means for varying each variable aperture to obtain desired color brightnesses for said color picture, and means for exposing for a predetermined time said photosensitive emulsions to the light passing through said transparency after said desired color brightness for said color picture is obtained.

4. In apparatus for deriving parameters for properly exposing photosensitive emulsions, said apparatus being of the type wherein electrical signals representative of point-by-point light transmission of a transparency having color-image aspects of an object are applied to associated color channels, and cathode-ray tube apparatus at the outputs of said color channels display a positive picture of said object in color, the improvement comprising a primary color light source for each color channel, means for directing light from all said sources upon said transparency, a plurality of variable apertures a different one of which is positioned between each light source and said transparency for controlling the brightness of light from said source, a color-television camera for producing electrical signals for each channel, said camera including filter means for matching the spectral sensitivity of said color-television camera to substantially duplicate the spectral sensitivity of said photosensitive emulsions, means for directing the light transmitted through said transparency into said color-television camera and blocking it from falling on said photosensitive emulsion, means for varying each variable aperture to obtain desired color brightness for said color picture, and means for actuating for a predetermined time said means for directing to no longer block said transmitted light from falling on said photosensitive emulsion.

5. In apparatus as recited in claim 4 wherein said means for directing the light transmitted through said transparency into said color-television camera and blocking it from said photosensitive emulsion is a pivotally supported mirror; and said means for actuating for a predetermined time said means for directing to no longer block said transmitted light from falling on said photosensitive emulsion includes means for pivoting said mirror to permit said transmitted light to fall on said photosensitive emulsion for said predetermined time.

6. In apparatus for deriving parameters for properly exposing print stock, said apparatus being of the type wherein electrical signals representative of point-by-point light transmission of a transparency having color-image aspects of an object are applied to associated color channels, and cathode-ray tube apparatus at the outputs of said color channels display a positive picture of said object in color, the improvement comprising a primary color light source for each color channel, means for directing light from all said sources upon said transparency, a color-television camera for producing electrical signals for each channel, said camera including filter means for matching the spectral sensitivity of said color-television camera to substantially duplicate the spectral sensitivity of said print stock, means for directing the light transmitted through said transparency onto said print stock, a mirror, means for positioning said mirror to block said transmitted light to said print stock and to reflect it to said camera, means for varying the brightness of each light source to obtain desired color brightnesses for said color picture, and means for moving said mirror for a predetermined time to unblock the path of said transmitted light to expose said print stock.

7. In apparatus as recited in claim 6 wherein said print stock comprises color-separation films and said means for directing the light transmitted through said transparency onto said print stock includes a plurality of partial mirrors positioned in the path of said transmitted light to direct it onto each one of the color-separation films and a filter in front of each color-separation film to provide a desired spectral distribution of the light which falls on the print stock.

References Cited in the file of this patent

UNITED STATES PATENTS

| | | |
|---|---|---|
| 2,071,952 | Scheibell | Feb. 23, 1937 |
| 2,269,161 | Morse | Jan. 6, 1942 |
| 2,309,048 | Curry | Jan. 19, 1943 |
| 2,388,842 | Hanson | Nov. 13, 1945 |
| 2,660,613 | Young | Nov. 24, 1953 |
| 2,710,889 | Tobias | June 14, 1955 |
| 2,757,571 | Loughren | Aug. 7, 1956 |
| 2,790,844 | Neugebauer | Apr. 30, 1957 |
| 2,842,610 | Crosfield | July 8, 1958 |